(12) United States Patent
Tang et al.

(10) Patent No.: US 7,602,734 B2
(45) Date of Patent: Oct. 13, 2009

(54) METHODS, SYSTEMS AND COMPUTER-READABLE MEDIA FOR DYNAMICALLY RECOGNIZING AND PROCESSING SERVICE ORDER TYPES IN A NETWORK MANAGEMENT SYSTEM

(75) Inventors: Harry Tang, Dunwoody, GA (US); James Kelley, Acworth, GA (US); Tommy Woods, Fairburn, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 571 days.

(21) Appl. No.: 11/039,194

(22) Filed: Jan. 18, 2005

(65) Prior Publication Data
US 2006/0160546 A1 Jul. 20, 2006

(51) Int. Cl.
*H04L 12/28* (2006.01)
(52) U.S. Cl. ................ 370/254; 370/395.1; 370/395.63
(58) Field of Classification Search ........................ None
See application file for complete search history.

(56) References Cited

U.S. PATENT DOCUMENTS 6,662,221 B1 * 12/2003 Gonda et al. ................ 709/223
6,901,440 B1 * 5/2005 Bimm et al. ................ 709/223
2004/0022379 A1 * 2/2004 Klos et al. ............. 379/201.01

\* cited by examiner

*Primary Examiner*—Jayanti K Patel
*Assistant Examiner*—Anthony Sol
(74) *Attorney, Agent, or Firm*—Akerman Senterfitt; Andrew C. Gust

(57) ABSTRACT

Methods, systems, and computer-readable media are provided for dynamically recognizing and processing service order types in a network management system. Service type data for a new service order type is registered in a database table while the network management system is operating. Then, a service order is received in the network management system and the service order is parsed to determine if the received service order corresponds with the new service order type based on the service type data registered in the database table. If the service order corresponds with the new service order type, then the service order is processed by the network management system. If the service order does not correspond with the new service order type, then updated service type data may be registered in the database table.

19 Claims, 4 Drawing Sheets

METHODS, SYSTEMS AND COMPUTER-READABLE MEDIA FOR DYNAMICALLY RECOGNIZING AND PROCESSING SERVICE ORDER TYPES IN A NETWORK MANAGEMENT SYSTEM

TECHNICAL FIELD

The present invention relates to dynamically recognizing and processing service orders in a network management system for provisioning and maintaining circuits in a data network.

BACKGROUND OF THE INVENTION

Data networks, such as frame relay and asynchronous transfer mode ("ATM") networks support the high speed transfer of video, audio and computer data in packets over a circuit established between a host device and one or more remote devices. The circuits in a data network comprise multiple logical connections called permanent virtual circuits ("PVCs") which must be provisioned in the network. In a typical data network, PVCs are provisioned upon receiving a service order designating various transmission characteristics for data in a network management system ("NMS"). The NMS may comprise a computer system running specialized software configured to recognize and process service orders received in the NMS. A typical service order ("SO") contains service type information which identifies a network service provided to customers. For example, service type information in a service order may describe a frame relay service.

Generally, an NMS may only process service orders for a limited number of supported service types. Currently, these service types are recognized by looking for a particular identification or "signature" within received service order data and comparing it to a known identifier coded in the NMS software. Once a service type is recognized in the NMS, the service order is processed based on algorithm supported for the service type.

Recent advances in communications technology have resulted in the creation of new service types which are required to be recognized and handled by the NMS in a hybrid data network. For instance, an NMS in a hybrid frame relay network may receive service orders including service types for metro Ethernet service, multicast Frame Relay service, or a customer managed network service, among others. Currently, the addition of these service types requires an update of the NMS software code so that they may be identified. However, current methods for updating the NMS software code to recognize new service types suffer from several drawbacks. One drawback is that the deployment of updated software code requires a shutdown and restart of the NMS computer system, resulting in undesirable downtime. Another drawback is that prior to deployment, additional time must be allocated to develop and test the updated software for recognizing and processing the new service types.

It is with respect to these considerations and others that the present invention has been made.

SUMMARY OF THE INVENTION

In accordance with illustrative embodiments of the present invention, the above and other problems are addressed by methods, systems and computer-readable media for dynamically recognizing and processing service types appearing in service orders that are received in a network management system in a data network. New service types are received and processed without having to shutdown the network management system, thereby minimizing downtime and avoiding or minimizing additional effort due to the deployment, development, and testing of updated software code.

According to one illustrative embodiment of the invention, a method is provided for dynamically recognizing and processing service types in a network management system. The method includes registering service type data table from a service order with a new service type in a database table while the network management system is operating, receiving a service order in the network management system, parsing the service order to determine if the received service order corresponds with the new service type based on the type data registered in the database table, and if the service order corresponds with the new service type, then processing the service order along with processing instructions stored in the registered service type table.

In registering service type data table for new service types in a database table the method may further include storing the service type data table and processing instructions in a plurality of variables in the database table. In parsing the service order to determine if the received service order has the service type matching the service type registered in the database table, the method may further include parsing the service order using the processing instructions for service order data associated with the type data in the database table, extracting information for provisioning the service described by the service type, and formatting the service order data for delivery to a work flow management system for processing or provisioning the service order within the network management system.

Illustrative embodiments of the invention may be implemented on a computer system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
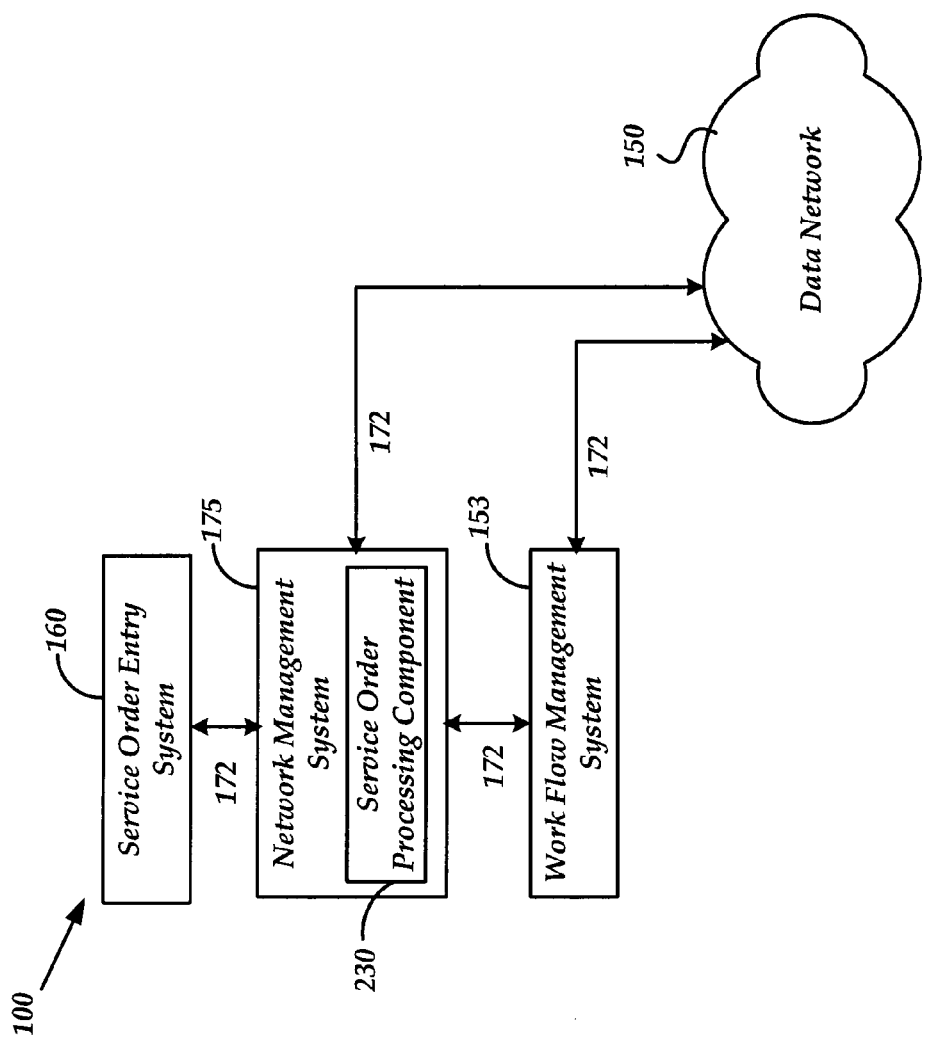
FIG. 1 is a block diagram illustrating aspects of a networked environment including a network management system utilized in and provided by the various embodiments of the invention.

In accordance with the present invention methods, systems and computer-readable media are provided for dynamically recognizing service type and processing service order in a network management system in a data network. Service orders with new service types are received and processed without having to shutdown the network management system, thereby minimizing downtime avoiding the deployment, development, and testing of new software code. In the following detailed description, references are made to the accompanying drawings that form a part hereof, and in which are shown by way of illustration, specific embodiments or examples. Referring now to the drawings, in which like numerals represent like elements, various aspects of the present invention will be described.

Embodiments of the present invention are generally employed in a networked environment 100 as shown in FIG. 1. The networked environment 100 includes a service order entry system 160 for issuing service orders, of various types, to network management system ("NMS") 175. The service order entry system 160 is in communication with the NMS 175 over communications channels 172. The NMS 175 may comprise a client-server computer system, including a service order processing component 230, for recognizing, parsing, and processing service orders from the service order entry system 160. The NMS 175 is in communication with a data network 150 and a work flow management system 153 over the communications channels 172.

The data network 150 may be a frame relay network, an ATM network, or a hybrid network supporting a plurality of network services, including, but not limited to, metro Ethernet service, multicast Frame Relay service, voice over IP ("VOIP") service, digital subscriber line ("ADSL") services, IP Centrex service, virtual private network ("VPN") service, and other customer managed network services known to those skilled in the art. The data network 150 may include one or more interconnected network elements, such as data packet switches (not shown), for communicating data. Those skilled in the art will appreciate that the data network may also contain other interconnected network devices and elements (not shown) such as digital access and cross connect switches (DACS), channel service units (CSUs), and data service units (DSUs). It will be further appreciated that the data network 150 may include network elements (not shown) which support interworking to enable communications between host and remote devices supporting dissimilar or hybrid protocols. Network elements in a data network supporting interworking may translate frame relay data packets or frames sent from a host FRAD to ATM data packets or cells so that a host device may communicate with a remote device having an ATM interface.

In the various illustrative embodiments of the invention, the NMS 175 may be utilized to register new service order types for recognizing service orders from the service order entry system 160. The NMS 175 may be further utilized for automatically provisioning service orders in the data network 150 or for forwarding service orders to the work flow management system 153 for manual provisioning in the data network 150. In automatically provisioning service orders, the NMS 175 communicates with the data network 150 to automatically provision a service (such as provisioning a frame relay circuit) for supported service types. For non-supported service types, the NMS 175 forwards instructions to the work flow management system 153 where the service is provisioned manually. An illustrative NMS is the Broadband Network Management System® ("BBNMS") marketed by TELCORDIA™ TECHNOLOGIES, Inc. of Morristown, N.J. The NMS 175 will be discussed in greater detail below with respect to FIGS. 2-4.

Figure 2:
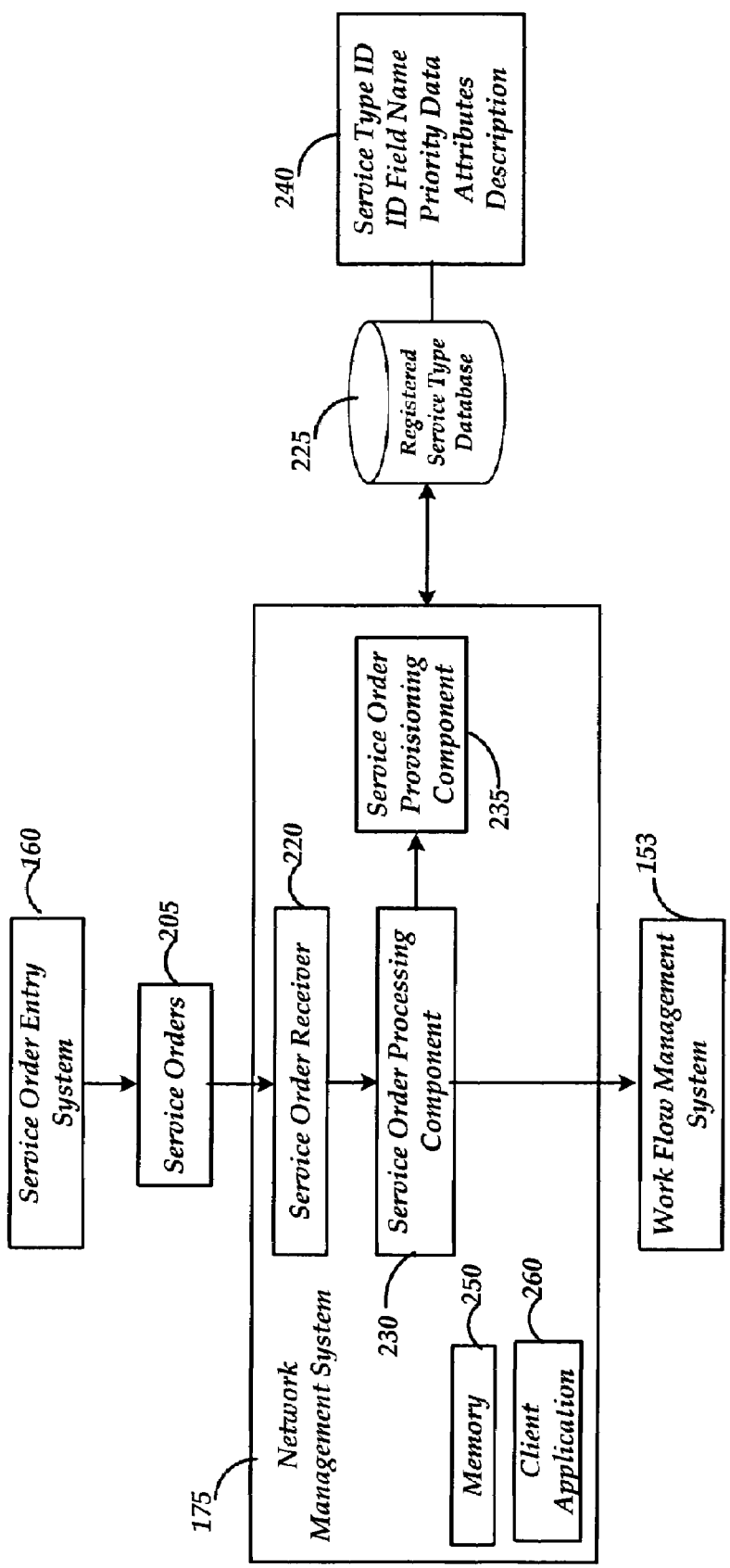
FIG. 2 is a block diagram illustrating components of the network management system of FIG. 1, for recognizing and processing new service order types, according to one embodiment of the invention.

FIG. 2 is a block diagram illustrating components of the NMS 175 discussed above in the discussion of FIG. 1, according to one embodiment of the invention. As discussed above with respect to FIG. 1, the NMS 175 receives service orders 205 from the service order entry system 160. The service orders 205 are received in the NMS 175 by a service order receiver 220 which then forwards the service orders 205 to the service order processing component 230. The service order processing component 230 processes the service orders 205 for provisioning based on whether the service types contained in the service orders 205 are supported by the NMS 175. Service types which are supported by the NMS 175 are forwarded to service order provisioning component 235 for automatic provisioning by the NMS 174. Service types which are not supported by the NMS 175 are forwarded to the work flow management system 153 for manual provisioning. Those skilled in the art will appreciate that the service order receiver 220, the service order processing component 230, and the service order provisioning component 235 may be software configured resources for receiving, forwarding, processing, and provisioning service order data in the NMS 175.

The NMS 175 is also in communication with a registered service type database table 225. The database 225 includes a table of known service types which are recognized and processed by the service order processing component 230. Each service type stored in the database 225 is associated with fields of service type data table 240. These fields include a Service Type ID for identifying the type of service order (e.g., frame relay, ATM, VOIP, etc.), a Field Name ID used in locating the field containing the Service Type ID in a service order 205, Priority Data indicating a priority level for the service type, Attributes for identifying processing or other special instructions for the service order type, and a Description for describing the service type.

The NMS 175 further includes a client application 260 for registering service types in the database 225 and for causing the NMS to retrieve the service type data table 240 from the database 225 for storing in memory 250. As will be discussed in greater detail below with respect to FIG. 3, in accordance with an illustrative embodiment of the invention, the NMS 175 may retrieve the service type data table 240 from the memory 250 after it has been retrieved from the database 225.

A service order 205 issued from the service order entry system 160 may include the service type data table 240, service related information such as customer information, a service activation schedule, and provisioning data for the service in the data network 150. In accordance with one illustrative embodiment, the service orders issued by the service order entry system 160 may include eligible service orders and ineligible service orders. Eligible service orders are defined as orders for services which are supported by the NMS 175 and may thus be automatically provisioned by the service order provisioning component 235. Ineligible service orders are defined as orders for non-supported services in the NMS 175 which are forwarded from the service order processing component 230 to the work flow management system 153 for manual provisioning. For instance, in a frame relay data network, eligible service orders may include frame relay service orders while ineligible service orders may include service orders for ATM, Metro Ethernet, IP Centrix, VPN, and the like. It will be appreciated that in the various illustrative embodiments of the invention, ineligible service orders are parsed by the service order processing component 230 to retrieve key attributes (i.e., provisioning instructions) which are then forwarded to the work flow management system 153 where the processing of the key attributes is handled manually.

It will further be appreciated that in accordance with one illustrative embodiment of the invention, the service type data table 240 in the database 225 may be associated with new (i.e., previously unknown) ineligible service types or known ineligible service types which are frequently updated (e.g., by adding or editing data fields of service type data table). It will further be appreciated that in accordance with one illustrative embodiment of the invention, known eligible service types which are not frequently updated may be hard coded in the service order processing component 230 and instructions contained within service orders corresponding to these service order types may be automatically carried out by the service order processing component 230.

As discussed above, the processing of service orders may include the provisioning of circuits in the data network 150. As is known to those skilled in the art and as defined herein, provisioning includes the establishment of physical and/or logical connections for communicating data between two or more devices over the data network 150. For instance, in a frame relay data network, provisioning may include the establishment of permanent virtual circuits ("PVCs") or switched virtual circuits ("SVCs") as logical connections comprising a network circuit.

Figure 3:
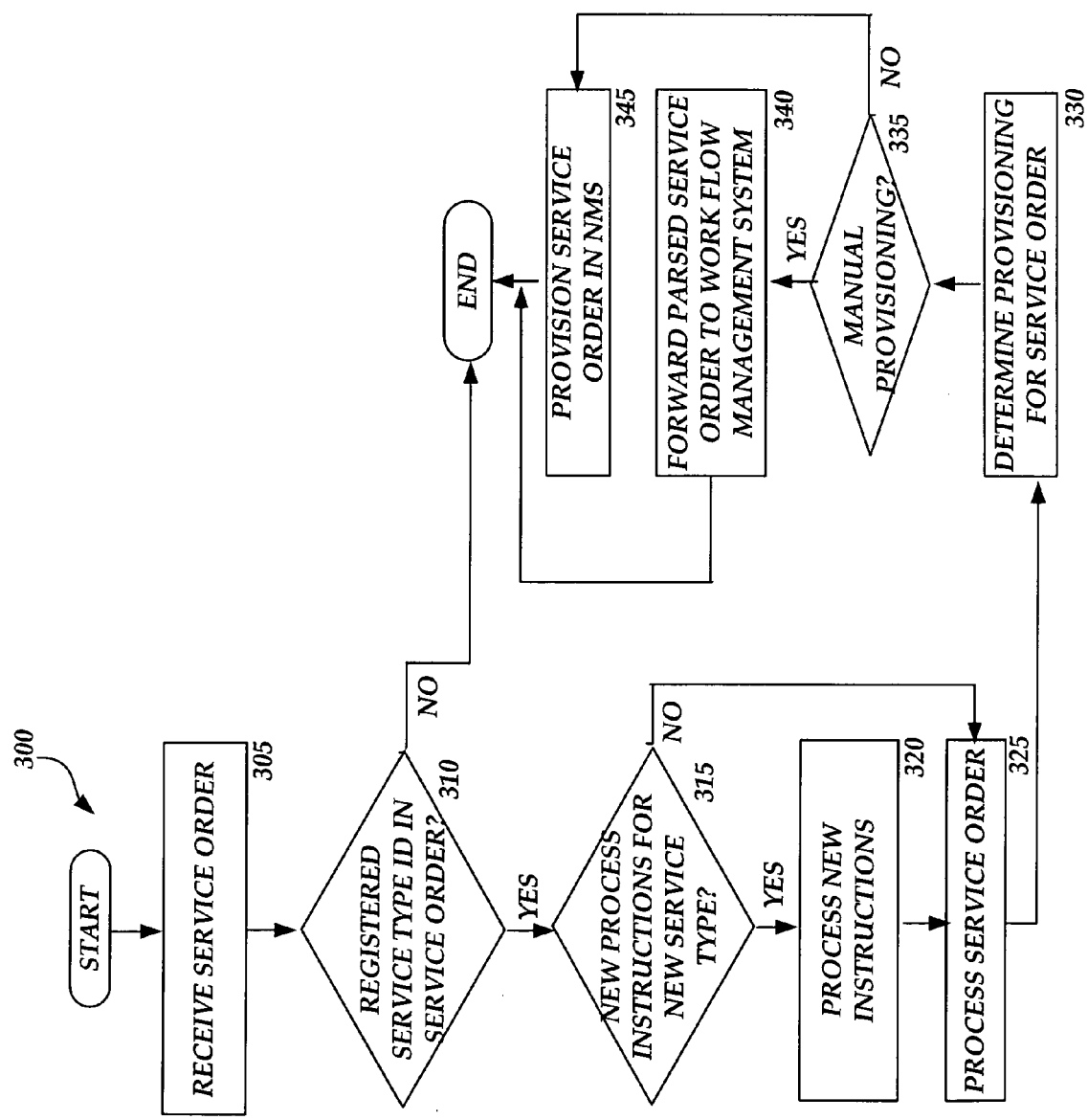
FIG. 3 is a flow diagram illustrating aspects of a process for dynamically recognizing and processing service order types in the network management system of FIGS. 1 and 2, according to one embodiment of the invention.

FIG. 3 shows an illustrative routine 300 for dynamically recognizing and processing service order types in the NMS 175, according to one embodiment of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3 and 4, and making up the illustrative embodiments of the present invention described herein are referred to variously as operations, structural devices, acts, or modules. It will be recognized by one skilled in the art that these operations, structural devices, acts, and modules may be implemented in software, in firmware, in special purpose digital logic, and any combination thereof without deviating from the spirit and scope of the illustrative embodiments of the present invention as recited within the claims set forth herein.

Referring now to FIG. 3, the routine 300 begins at operation 305 where service order receiver 220 in the NMS 175 receives a service order 205 from the service order entry system 160 and forwards the service order 205 to the service order processing component 230. The routine 300 continues at operation 310 where the service order processing component 230 determines if a known registered service type ID is contained within the received service order 205. In particular, the service order processing component 230 may access the service type data table 240 which may be loaded from the database 225 into the memory 250 by the client application 260. Once the service type data table 240 is accessed, the service order processing component 230 then examines each instance of service type data table according to a predetermined priority to determine if one of the registered service types exists in the received service order 205.

In particular, the service order processing component 230 will parse the service order 205 to determine if a service type ID for a registered service type is present. For instance, the service order processing component 230 may read an "id_location" field from a particular instance of the service type data table 240 and search the location specified by the id_location field in the service order 205 for an identifier string matching the registered service type ID "ident1." If a match is found for ident1 (in the location specified by the id_location field) in the service order 205, then the service order is a recognized service type. If a particular service type has two identifiers (i.e., ident_1, and ident_2), the service order processing component 230 will determine if both identifier strings appear in the service order 205 in the section specified by the id_location field. If both identifiers found in the proper section, then the service order 205 is a recognized service type.

It will be appreciated that service type identifiers for different types of service order may co-exist in a single service order. The service type identifiers in these service orders may be associated with a priority value stored in a Priority field in the service order database table 240. The identifier with the highest priority value will be checked first in the service order by the service order processing component 230. It will further be appreciated that a service type identifier may appear in different sections for different types of service orders. Thus, the value of the id_location field in the service order database table 240 indicates to the service order processing component 230 where the registered service type identifier should appear for a specific service order type. It will further be appreciated by those skilled in the art that the service order processing component 230 may use list variables to hold the contents from each instance of the service type data table 240. The list variables are transparent to the actual data values in the service type data table 240. As a result, the software code is immune to the actual value of the service type instance data.

If, at operation 310, a registered service type ID is not found in the received service order 205, then the service order processing component 230 determines that the received service order is an unrecognized service type. In particular, the service order processing component 230 will cease the processing of the service order and create a log containing the unrecognized service order in the NMS 175 for debugging purposes. The routine 300 then ends.

If, at operation 310, a registered service type ID is found in the received service order 205, then the routine 300 continues at operation 315 where the service order processing component 230 determines if there are any special parsing/processing instructions associated with the recognized service type in the service type data table 240. In particular, the service order processing component 230 may determine if there is a new set of attributes associated with the service order type which are needed to process the received service order 205. If the service order processing component 230 determines that there are new attributes needed for processing the service order 205, the routine 300 continues at operation 320 where the service order processing component 230 parses and processes the service order 205 according to the instructions (i.e., attributes) provided in the service type data table 240. For instance, in looking for special processing instructions the service order processing component 230 may check an "instruction/new_set_attr_names" field in the service type data table 240 for a service type instance. If the instruction/new_set_attr_names field has non-empty values, then the service order processing component 230 will parse the service order 205 against this field and extract the values.

It will be appreciated that, newly registered service types after an initial deployment of the NMS 175, may include newly added data fields which need to be parsed and/or specially processed. These special processing "instructions" may be added to the service type data table 240 when the new service types are registered. After processing any special instructions for a recognized service type in the service order 205, the routine 300 continues from operation 320 at operation 325. Returning now to operation 315, if the service order processing component 230 determines that there are no special instructions which need to be processed for a recognized service type in the service order 205, then the routine 300 branches from operation 315 to operation 325.

At operation 325, the service order processing component 230 initiates processing of the service order 205. In particular, the service order processing component 230 processes the service order 205 based on service type data available in the service type database table 240 when the NMS 175 is initially deployed. The processing performed by the service order processing component 230 may include parsing the service order 205 for service order data, retrieving the service order data from the service order, formatting the service order data for delivery to the work flow management system 153 for provisioning of a service described in the service order, and parsing the service order 205 for provisioning data to provision a circuit in a data network 150.

After the service order 205 has been parsed and processed at operation 325, the routine 300 continues at operation 330 where the service order processing component 230 determines if the service order 205 may be provisioned automatically in the NMS 175 or needs to be manually provisioned in the work flow management system 153. As briefly discussed above with respect to FIG. 2, the NMS 175 may be configured with a list of eligible service types for services which may be provisioned automatically. It will be appreciated that these eligible service types may be known when the NMS 175 is developed. The routine 300 then continues at operation 335.

If, at operation 335, the service order processing component 230 determines that the service order 205 must be provisioned manually, the routine 300 continues at operation 340 where the service order processing component may send formatted service order data from the service order 205 to the work flow management system 153. The work flow management system 153 may then utilize the received service order data to assign resources (i.e., technicians) to manually provision the service identified in the service order 205. The routine 300 then ends.

If, at operation 335, the service order processing component 230 determines that the service order 205 may be automatically provisioned by the NMS 175, the routine 300 branches to operation 345 where the service order 205 is automatically provisioned. It will be appreciated that the automatic provisioning of service orders in a network management system is known to those skilled in the art. The routine 300 the ends.

Figure 4:
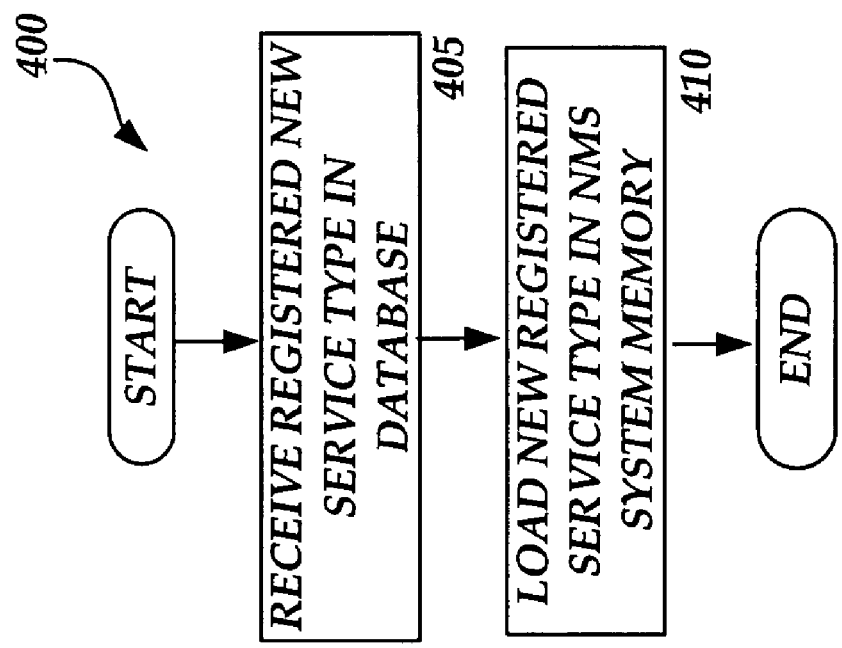
FIG. 4 is a flow diagram illustrating aspects of a process for registering new service types for service orders in the network management system of FIGS. 1 and 2, according to one embodiment of the invention.

FIG. 4 shows an illustrative routine 400 for registering new service types for service orders in the NMS 175, according to one embodiment of the invention. The routine 400 begins at operation 405 where a new registered service type is received in the database 225. In particular, the client application 260 may register service type related data in the service type database table 240 stored in the database 225 including adding new service type related data. It will be appreciated by those skilled in the art that the client application 260 may utilize an SQL process to add/register the new service type related data into the service type database table 240.

The routine 400 then continues at operation 410 where the newly registered service types are loaded into the memory 250 of the NMS 175. In particular, the client application 260 may request the NMS 175 to reload the newly updated service type database table 240 from the database 225, containing all instances of the old and newly added (i.e., registered) service types. Thus, when a service order is received in the NMS 175 corresponding to one of the newly registered service types, the service order processing component 230 in the NMS 175 is able to locate the service type identifier and parse and process the order based on the associated service type data stored in memory. The routine 400 then ends.

It will be appreciated that the operation 410 increases the performance of the NMS 175 in comparison to reading the service type database table 240 from the database 225 each time a service order is received in the NMS 175. In particular, loading all the instances of registered service types into the memory 250 of the NMS 175 increases the speed at which the service order processing component 230 searches for and compares service type identifiers in received service orders. It will be further appreciated that the new service type related data may be loaded into the NMS 175 without any impact to the system. That is, the new service type related data may be loaded without shutting down and restarting the NMS 175.

Based on the foregoing, it should be appreciated that the various embodiments of the invention include methods, systems, and computer-readable media for dynamically recognizing and processing service order types in a network management system in a data network. New service order types are received and processed without having to shutdown the network management system or change existing software code, thereby minimizing downtime due to the deployment, development, and testing of updated software code. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for dynamically recognizing and processing service order types in a network management system, comprising:
    registering service type data for a new service order type in a database table while the network management system is operating;
    receiving a service order in the network management system;
    parsing the service order to determine if the received service order corresponds with the new service order type based on the service type data registered in the database table; and
    if the service order corresponds with the new service order type, then processing the service order, wherein the service type data comprises at least one identification of the service order and a priority value associated with each identification in the service order.

2. The method of claim 1, wherein registering service type data for a new service order type in a database table comprises storing the service type data in a plurality of variables in the database table, wherein the service type data comprises a data field indicating the location of a service order identification in the service order, the identification of the service order, the priority value associated with each identification in the service order, a name associated with the service order, a set of attributes for processing the service order, and description text for the service order.

3. The method of claim 1, wherein parsing the service order to determine if the registered service order type corresponds with the new service order type based on the service type data registered in the database table comprises: parsing the new service order for an identifier; and comparing the identifier in the new service order to the service type identifier registered in the database table to determine a match.

4. The method of claim 1, wherein processing the service order comprises: parsing the service order for service order data associated with the service type data in the database table; retrieving the service type data registered in the database table; and formatting the service order data for delivery to a work flow management system for provisioning of a service described in the service order.

5. The method of claim 4, wherein parsing the service order for service order data associated with the service type registered in the database table comprises parsing the service order for provisioning data for a circuit in a data network.

6. The method of claim 1 further comprising, if the service order does not correspond with the new service order type, then registering updated service type data in the database table.

7. A network management system for dynamically recognizing and processing service order types, comprising:
   a database table for storing registered service type data determined by a plurality of service order types;
   a memory, in communication with the database table, for receiving the registered service type data from the database table and storing executable program code for dynamically recognizing and processing service orders; and
   a processing component, in communication with the memory, the processing component being responsive to computer-executable instructions contained in the program code and operative to:
   receive registered service type data for a new service order type from the memory; parse a received service order to determine if the received service order corresponds with the new service order type based on the registered service type data; and if the service order corresponds with the new service order type, then process the service order, wherein the registered service type data comprises a data field indicating the location of a service order identification in the service order, at least one identification of the service order, a priority value associated with each identification in the service order, a name associated with the service order, a set of attributes for processing the service order, and description text for the service order.

8. The network management system of claim 7, wherein the registered service type data is stored in a plurality of variables in the database table.

9. The network management system of claim 7, wherein the processing component, in parsing the service order to determine if the received service order type corresponds with the new service order type based on the registered service type data received in the memory, is further operative to: parse the new service order for an identifier; and compare the identifier in the new service order to the registered service type data in the memory to determine a match.

10. The network management system of claim 7, wherein the processing component, in processing the service order, is further operative to: parse the service order for service order data associated with the registered service type data in the database table; retrieve the service order data associated with the registered service type data from the service order; and format the service order data for delivery to a work flow management system for processing.

11. The network management system of claim 7, wherein the service order data comprises provisioning data for a circuit in a data network.

12. The network management system of claim 11, wherein the circuit comprises a frame relay circuit.

13. The network management system of claim 11, wherein the circuit comprises a voice over Internet protocol (VOIP) circuit.

14. The network management system of claim 11, wherein the processing component is further operative to reload updated registered service type data from the database table.

15. A computer-readable medium encoding computer-executable instructions which when executed on a computer perform a method for dynamically recognizing and processing service order types in a network management system, the method comprising:
   registering service type data for a new service order type in a database table while the network management system is operating;
   receiving a service order in the network management system;
   parsing the service order to determine if the received service order corresponds with the new service order type based on the service type data registered in the database table; and
   if the service order corresponds with the new service order type, then processing the service order, wherein the service type data comprises at least one identification of the service order and a priority value associated with each identification in the service order.

16. The computer-readable medium of claim 15, wherein registering service type data for a new service order type in a database table comprises storing the service type identifier data in a plurality of variables in the database table, wherein the service type data comprises a data field indicating the location of a service order identification in the service order, the identification of the service order, the priority value associated with each identification in the service order, a name associated with the service order, a set of attributes for processing the service order, and description text for the service order.

17. The computer-readable medium of claim 15, wherein parsing the service order to determine if the registered service order type corresponds with the new service order type based on the service type data registered in the database table comprises: parsing the new service order for an identifier; and comparing the identifier in the new service order to the service type data registered in the database table to determine a match.

18. The computer-readable medium of claim 15, wherein processing the service order comprises: parsing the service order for service order data associated with the service type data in the database table; retrieving the service type data registered in the database table; and formatting the service order data for delivery to a work flow management system for provisioning of a service described in the service order.

19. The computer-readable medium of claim 18, wherein parsing the service order for service order data associated with the service type data registered in the database table comprises parsing the service order for provisioning data for a circuit in a data network.

* * * * *